United States Patent [19]
Asada

[11] Patent Number: 5,762,663
[45] Date of Patent: Jun. 9, 1998

[54] WET DUST COLLECTING APPARATUS

[75] Inventor: Yasunori Asada, Tokyo, Japan

[73] Assignee: Nicotec Co., Tokyo, Japan

[21] Appl. No.: 636,239

[22] Filed: Apr. 23, 1996

[30] Foreign Application Priority Data

Jun. 30, 1995 [JP] Japan .................. 7-188696

[51] Int. Cl.[6] .................................. B01D 47/02
[52] U.S. Cl. .................. 55/249; 55/250; 55/259; 95/226; 261/119.1
[58] Field of Search ................ 55/255, 256, 249, 55/250, 259; 261/81, 123, DIG. 48, 119.1; 95/216, 218, 226, 214

[56] References Cited

U.S. PATENT DOCUMENTS

| | | | |
|---|---|---|---|
| 1,062,446 | 5/1913 | Ernst | 261/123 |
| 2,015,174 | 9/1935 | Anglemyer | 55/255 X |
| 3,581,467 | 6/1971 | Donnelly | 95/218 X |
| 4,224,042 | 9/1980 | Garigioli | 261/123 X |
| 5,078,759 | 1/1992 | Kira | 55/255 X |
| 5,397,381 | 3/1995 | Keintzel et al. | 55/256 X |
| 5,520,714 | 5/1996 | Muschelknautz | 261/123 X |

*Primary Examiner*—Richard L. Chiesa
*Attorney, Agent, or Firm*—McCormick, Paulding & Huber

[57] ABSTRACT

A wet dust collecting apparatus has a housing, a suction passage formed in the housing for sucking hot dust, a water tub arranged in the housing, a mist room formed in part by water in the water tub, and further defined by a partition plate arranged downstream of a chamber associated with the sucking passage. A dust filter is arranged downstream of the mist room, and a fan sucks hot dust into the suction passage, through a comb-toothed mist generator arranged between the chamber associated with the suction passage and the mist room. Dust-containing air is sucked in the suction passage and blown through the mist generator so as to vibrate the water surface thereby generating mist in the mist room. The hot dust is absorbed by the mist and cooled thereby. The hot dust containing mist is collected by the dust filter thereby separating the dust and water content from the air.

2 Claims, 3 Drawing Sheets

WET DUST COLLECTING APPARATUS

BACKGROUND OF THE INVENTION

1. Field of the Invention

The present invention relates to a wet dust collecting apparatus, and more particularly a wet dust collecting apparatus for collecting fume dust generated when machining with a laser and plasma machine or cold dust generated in large quantities with a shotblast, or sanding machine and the like.

2. Prior Art

As well known, when machining with a laser and plasma machine, fume dust is generated having a very high temperature of 200°–300° C. Apparatus for collecting such fume dust have been known. Such dust collecting apparatus may be of a dry filter type and a wet dust collecting apparatus.

Advantages of such conventional wet dust collecting apparatus over that of the dry filter type are:

First, when collecting with the dry filter, there can be risks that said dry filter will be burned, or the flue outlet may cause combustion resulting in a fire, and therefore any unsupervised operation of the machine is impossible. With the wet dust collecting apparatus, unsupervised operation is possible without the risk of fire;

Second, with the dry filter type dust collecting apparatus, there is involved such problem of environmental pollution that when discharging the dust gathered in a recovery box, the dust will fly up to cause a risk of inhalation by a worker. With the wet dust collecting apparatus, some degree of solidification of the dust by addition of moisture content enables more efficient treatment of the dust, plus there can be provided a good working environment without reintroducing dust into the environment;

Third, in the case of dry filter type, as the filter clogs with dust, dust sucking efficiency thereof largely decreases and results in so-called scorch and the like as well as worsened machining precision. While with the wet dust collecting apparatus, there is no pressure loss due to clogging and, like and therefore, machining precision can be balanced with a constant dust sucking efficiency; and Fourth with the wet dust collecting apparatus, there can be provided a deodorizing function since water can remove odor.

Having many merits as above, the wet dust collecting apparatus is advantageous in case of machining with a laser and plasma machine.

However, such conventional wet dust collecting apparatus is generally constructed such that a mist generator is arranged in the dust collecting apparatus. The hot dust is sucked in a mist atmosphere generated by the mist generator and adheres to the mist to be cooled and then collected with a filter. Such conventional wet dust collecting apparatus provided with the mist generator involves such problem that, since the mist generator must be separately provided in the dust collecting apparatus, construction of the latter apparatus becomes largely complicated and large-sized leading to increased constructing costs.

SUMMARY OF THE INVENTION

The present invention has been conceived on the basis of the above-mentioned situation and aimed at the provision for a wet dust collecting apparatus simply constructed, small-sized and of low cost that is capable of introducing hot dust generated when machining with a laser and plasma machine or cold dust generated in large quantities with a shotblast, sanding machine and the like into mist generated using the suction pressure for the dust so as to efficiently collect it without separately providing a mist generator. This new dust collecting apparatus is also capable of unmanned operation without any risk of causing fire, while nevertheless enabling easy posttreatment and stabilizing the machining precision, and further has a deodorizing function.

To achieve the above objects, the wet dust collecting apparatus of the present invention is constructed such that a wet dust collecting apparatus comprises a housing, a suction passage formed in the housing for sucking dust, a water tub arranged in the housing, a mist room formed adjacent the water in the tub, said mist room being defined in part by the same water level and by a partition plate arranged downstream of the sucking passage, a dust filter arranged downstream of the mist room, a fan for sucking hot dust from the suction passage through the mist room to the filter, and a comb-toothed mist generator arranged at a lower edge of the partition plate between the suction passage and the mist room. The arrangement being such that dust-containing air sucked into the suction passage is blown against the mist generator so as to vibrate the water surface with high speed thereby generating mist in the mist room. The hot dust is adsorbed in the mist and cooled thereby, the hot dust containing mist is collected by the dust filter thereby separating the dust and water from the air flow.

In the present invention, the mist generator is arranged in such manner that the lower end thereof is partly immersed in the water. The dust containing air is fed at high speed to the water surface from the downstream end of the suction passage. The air flow is narrowed between a comb-toothed section on mist generator and the dust containing air causes the water surface to vibrate at high speed and automatically generate mist which then floats in the mist room. Fume dust of the dust containing air rebounded on the water surface adheres to the mist and is then collected by the filter after being cooled. Some dust drops into the water without rebounding on the water surface and is left to be gathered from the bottom surface of the water tub.

As described above, the wet dust collecting apparatus of the present invention has many excellent effects in that it can efficiently collect hot fume dust generated when machining with the laser and plasma machine and the like or cold dust generated in large amount with the shotblast or sanding machine and the like. No separate mist generator is required because the dust laden air is absorbed into the mist generated by making use of the suction pressure. Unmanned operation and easy post-treatment is possible since the dust is collected with moisture without causing the risk of fire. This apparatus provides a stable environment for machining precision since there is no pressure loss due to clogging and the like. It also provides a deodorizing function since any odor is collected by water. It offers a very simplified construction that is of small-size and can be of low-price.

DESCRIPTION OF THE PREFERRED EMBODIMENT

Now, the present invention will be described in detail based on an example illustrated in the accompanying drawings.

Figure 1:
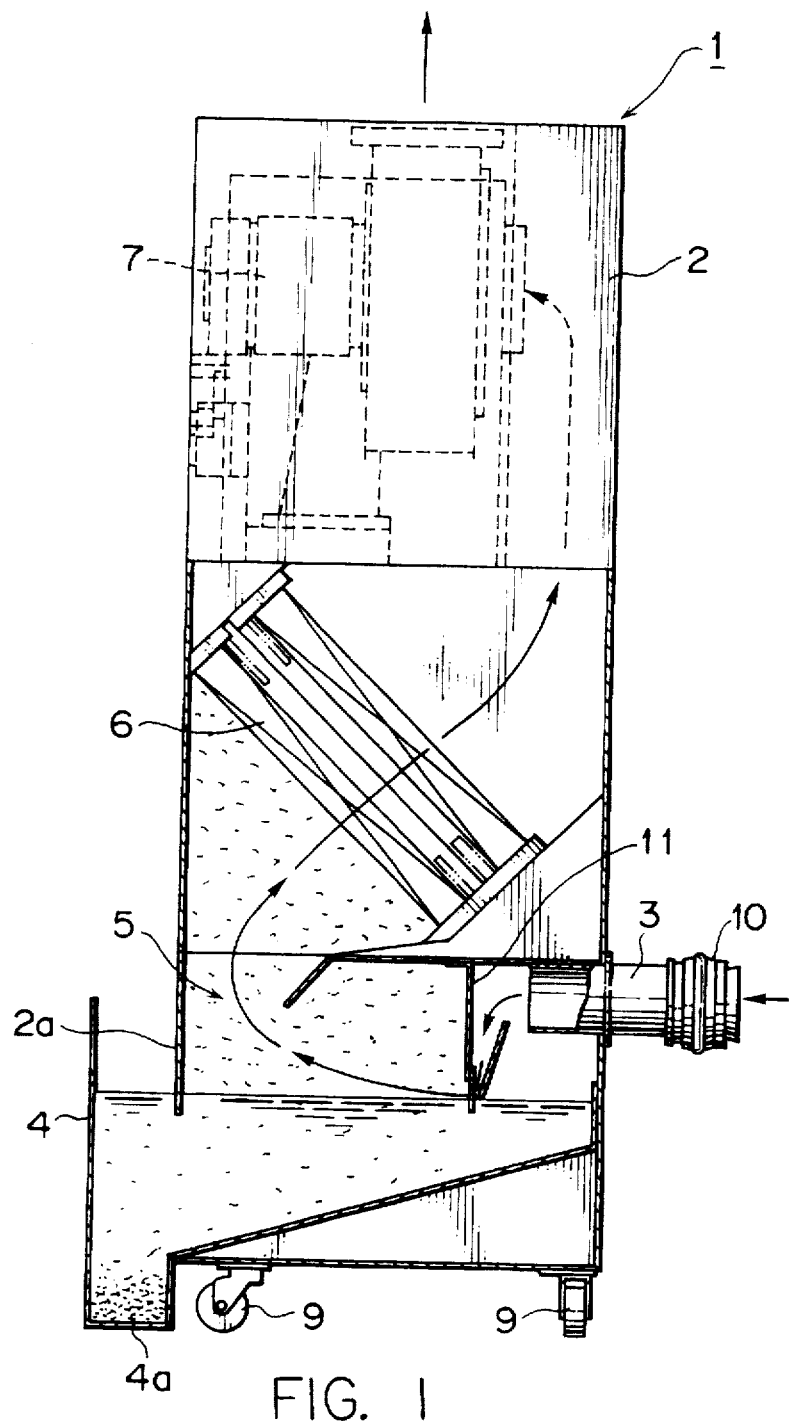
FIG. 1 is a cross-sectional view showing an example of the wet dust collecting apparatus according to the present invention.
Figure 2:
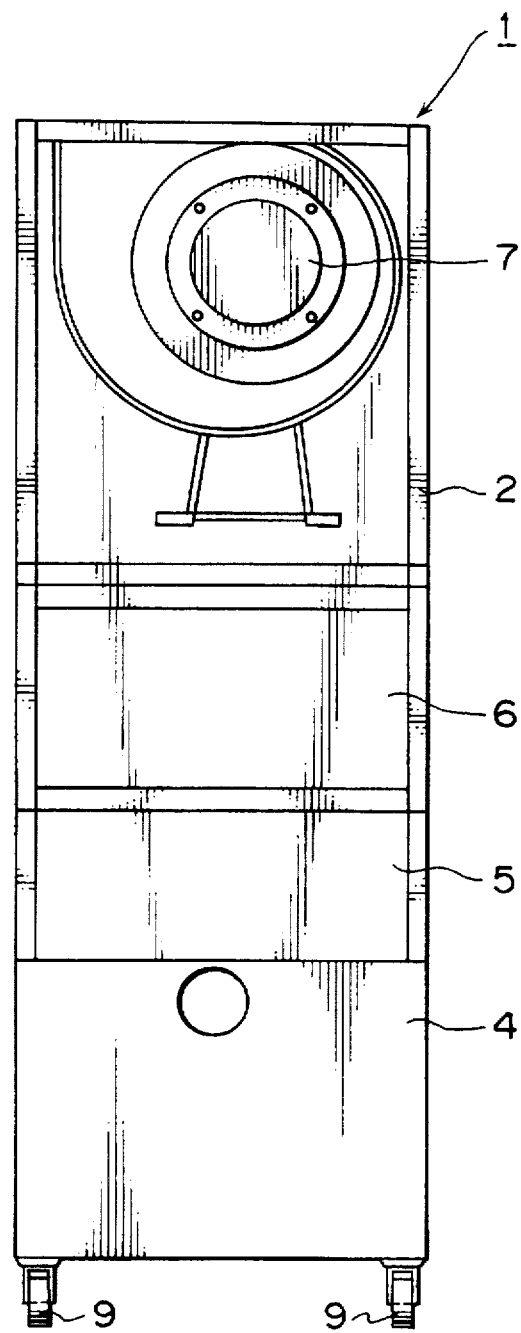
FIG. 2 is a left side view of said wet dust-collecting apparatus.

As shown in FIGS. 1 and 2, the wet dust collecting apparatus 1 for collecting fume dust generated when machining with a laser and plasma machine comprises a housing 2, a suction inlet passage 3 formed in the housing 2 for sucking high temperature laser and plasma dust into a chamber that is formed in part by the water level W in a water tub 4 arranged downstream of the suction passage 3. Along side this chamber, and also defined in part by the water level W, a mist room 5 is formed at an upper portion of the water tub 4. A mist separating filter 6 of the collision and inertia type is arranged above the mist room 5. A fan for sucking the laser and plasma dust from the suction passage 3 through the mist room 5 to the mist filter 6 is also provided. A comb-toothed mist generator 8 is arranged between the chamber of suction passage 3 and mist room 8.

The housing 2 is provided with casters 9 for facilitating movement thereof. The suction passage 3 is formed with heat resisting material and an extendable duct 10 is connected to the upstream end of the suction passage 3. The front end of the duct 10 may be connected to a fume dust generating portion in the laser beam and plasma arc cutting machine (not shown).

A comb-toothed mist generator 8 is provided at the lower end of a partition plate 11 and confines the flow out of a chamber C downstream of the suction passage 3. A restriction plate 12 is arranged at an angle to the partition plate downstream of the suction passage 3 and servers to the lower end 12a of the restriction plate 12 and the lower end of the mist generator 8 is provided a slight gap for this purpose. The restriction plate 12 may be formed integrally with the mist generator 8.

Figure 3:
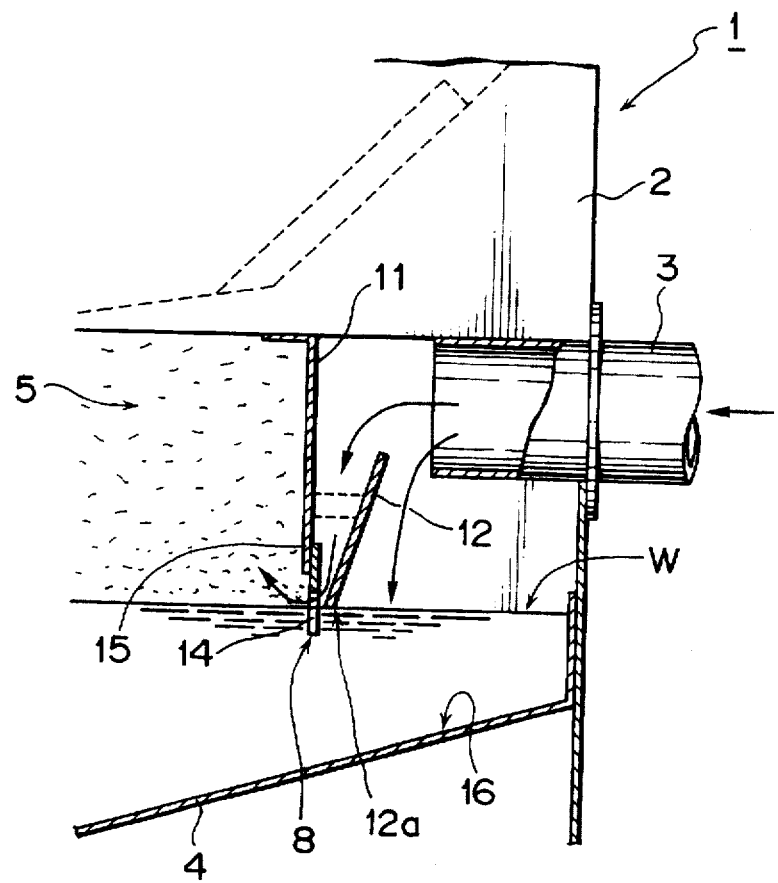
FIG. 3 is an enlarged view illustrating a communication portion between the suction passage and the mist room.
Figure 4:
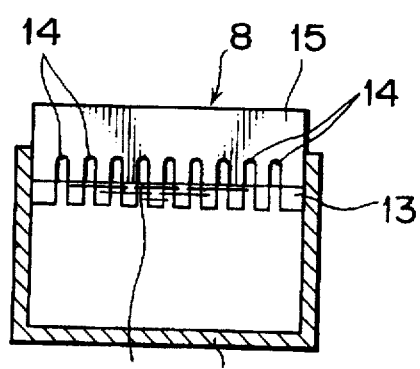
FIG. 4 is an enlarged side view showing the comb that serves as a mist generator in the wet dust collecting apparatus.

The mist generator 8 is arranged such that the comb-toothed section 13 defines a plurality of openings or gaps at the water surface level W as a result of the comb being partly immersed in the water tub 4 as shown in FIGS. 3 and 4. Thus there is formed a number of narrow dust-containing air lanes 14 arranged side-by-side by the comb-toothed section 13 and the water surface W.

Accordingly, the fume dust sucked in the suction passage 4 flows through the narrow space or gap between the partition plate 11 and the restriction plate 12. Since this gap between the partition plate 11 and the restriction plate 12 is gradually narrowed as it approaches the water surface W, the dust-containing air flowing in the gap is gradually speeded up and then flows into the mist room 5 passing through the dust-containing air lanes 14 of the mist generator 8. At this time, the dust-containing air passing through the dust-containing air lanes 14 forces the water surface W to vibrate at a high rate so as to generate mist which floats in the mist room 5 and thus there is formed a perfect mist atmosphere.

By adjusting the height of the water surface W, the amount of generated mist can be appropriately adjusted. Opening of the dust containing air lanes 14 increases the misting. Closing off these air lanes reduces the misting.

As for the water tub 4, it is arranged under the housing 2, and the water is filled therein to immerse the lower end portion 2a of the side wall of the housing 2 so as to form the mist room 5. The mist room is defined both by the water surface W and the partition plate 11. The bottom portion of the water tub 4 is formed by a slope 16 so that the sludgy dust is precipitated and deposited thereon and flows into the pocket 4a to be gathered periodically therefrom.

Each filter element of the mist separating filter 6 is formed of an aluminium alloy, stainless steel or the like which has excellent heat resistance, water resistance and corrosion resistance, and, though unillustrated in the drawings, a plurality of L-typed plates thereof are precisely arranged and fixed to a frame.

The fan 7 can be an air suction type employed in conventional dust collecting apparatus and therefore detailed explanation thereof will be omitted.

Since the wet dust collecting apparatus 1 according to this embodiment is constructed as above, the hot laser and plasma dust sucked in the suction passage 3 of the housing 1 by the action of the fan 7 flows through a gradually narrowed gap between the partition plate 11 and the restriction plate 12, and after its flowing velocity has been gradually increased as it approaches the water surface X, further passes through further restricted dust-containing air lanes 14 in the mist generateor 8 with high speed. The dust-containing air thus speeded up at the dust-containing air lanes 14 forces the water surface W to vibrate rapidly so as to generate mist on the water surface W with waterdrops of the water surface W finely grained, and the mist thus generated is carried into the mist room 5 by the flow of air (as suggested by the arrow) and floats therein.

Since the mist thus generated is floating in the mist room 5, the laser and plasma dust contained in the air is rebounded on the water surface and introduced into the mist room 5, and then sucked into the mist separating filter 6 by the fan 7 after adhering to the mist within the mist room 5. Since the laser and plasma dust is very fine one, dust collection can be effectively carried out by making it adhere to the mist. Of course, some larger particles of the laser and plasma dust may be dropped in the water without rebounding on the water surface W and is precipitated on the bottom of the water tub 4.

With the mist separeting filter 6, the laser and plasma dust adhered to the mist is effectively collected by the principle of collision and inertia and flows together, with the moisture content to be removed. The collected laser and plasma dust may flow into the water tub 4 together the moisture content.

Clean air after completion of the dust collection work by the mist separating filter 6 is then exhausted outside the housing 2 by the action of the fan 7.

A slope 16 is provided on the bottom portion of the water tub 4 and the sludgy dust precipitated and deposited down into a pocket portion 4a and condensed to some degree of hardness so as to be easily drawn up. Alternatively, the above sludgy dust may be automatically removed out of the apparatus by means of a screw conveyer or the like.

While the present invention is explained in the above embodiment by means of an example applied to the wet dust collecting apparatus for collecting laser and plasma dust, it is not limited to such applications and can be applied also to other uses for such a wet dust collecting apparatus for collecting cool dust or other fine dust generated in large quantities with a shotblast, or sanding machine or the like.

Further, in accordance with the present invention, the water level adjustment allows the total area of the dust containing air passage 14 of the mist generator 8 to be automatically controlled by varying the pressure loss which changes the amount of air flow through the apparatus.

What is claimed is:

1. A wet dust collecting apparatus comprising:
   a housing having a lower tub portion filled with water to a level (W), an air inlet passage for sucking dust laden air into a chamber defined in part by said water level (W) inside said housing, a partition plate having a lower edge defining a flow restricted air outlet for said chamber adjacent said water level (W), said lower partition plate edge defining a comb with teeth projecting below said water level (W) whereby a mist generating air outlet is provided at said air outlet of said chamber, said housing further defining a mist room, said mist room also defined in part by said water level (W), a dust filter defining an upper boundary of said mist room, air moving means above said filter for moving dust laden air into said inlet passage through said chamber and through said flow restricted air outlet of said chamber into said mist room and thence through said filter to be exhausted at the top of said housing by said air moving means, and said flow restricted air outlet further defined by a flow restricting plate arranged adjacent said partition plate to increase the speed of air movement through said comb teeth at said water level (W).

2. The wet dust collecting apparatus according to claim 1, wherein said mist generating teeth of said comb are arranged perpendicular to the water level (W) so as to generate ripples in the water level in said mist room and thereby improve the mist making efficiency thereof.

* * * * *